(12) United States Patent
Kuriyama et al.

(10) Patent No.: US 8,662,959 B2
(45) Date of Patent: Mar. 4, 2014

(54) CUTTING METHOD AND CUTTING DEVICE FOR HARD MATERIAL

(75) Inventors: Kunitaka Kuriyama, Shizuoka (JP); Masahiko Fukuta, Fuji (JP); Katsuhiko Sekiya, Higashihiroshima (JP); Yasuo Yamane, Higashihiroshima (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 898 days.

(21) Appl. No.: 12/608,037

(22) Filed: Oct. 29, 2009

(65) Prior Publication Data
US 2010/0120337 A1    May 13, 2010

(30) Foreign Application Priority Data

Nov. 12, 2008   (JP) ................................ 2008-290174

(51) Int. Cl.
*B24B 1/00*    (2006.01)

(52) U.S. Cl.
USPC ................ 451/28; 82/1.11; 82/134; 408/10; 451/49; 451/61; 451/166; 451/246; 451/251

(58) Field of Classification Search
USPC ............. 82/1.11, 134; 264/2.5; 451/5, 10, 11, 451/28, 49, 61, 166, 246, 251; 408/10
See application file for complete search history.

(56) References Cited

U.S. PATENT DOCUMENTS

| | | | | |
|---|---|---|---|---|
| 3,468,072 A | * | 9/1969 | Bernelin et al. ................ | 451/11 |
| 5,067,284 A | * | 11/1991 | Putnam et al. ................. | 451/28 |
| 5,802,937 A | * | 9/1998 | Day et al. ...................... | 82/1.11 |
| 6,729,212 B2 | * | 5/2004 | Muller ........................... | 82/1.11 |
| 7,140,812 B2 | * | 11/2006 | Bryan et al. .................... | 407/119 |
| 7,178,433 B2 | * | 2/2007 | Matsuda et al. ................ | 82/1.11 |
| 7,686,988 B2 | * | 3/2010 | Hosoe ............................ | 264/2.5 |
| 7,788,998 B2 | * | 9/2010 | Ethington et al. .............. | 82/123 |
| 2004/0113299 A1 | * | 6/2004 | Hosoe ............................ | 264/2.5 |

FOREIGN PATENT DOCUMENTS

| | | |
|---|---|---|
| JP | 2001-009663 | 1/2001 |
| JP | 2002-176763 | 6/2002 |
| JP | 2006-026855 | 2/2006 |
| JP | 2007-266585 | 10/2007 |
| JP | 2009-233837 | 10/2009 |

OTHER PUBLICATIONS

English language abstract of JP-2006-026855.
Machine English language translation of JP-2006-026855.
Japanese Office Action issued in JP 2008-290174 issued on May 7, 2013.
English language translation of Japanese Office Action issued in JP 2008-290174 on May 7, 2013.
English language abstract of JP 2002-176763 published on Jun. 21, 2002.

(Continued)

*Primary Examiner* — Timothy V Eley
(74) *Attorney, Agent, or Firm* — DLA Piper LLP (US)

(57) ABSTRACT

A method of cutting a workpiece made of a highly-hard material is provided. The workpiece is cut by a machining device including a workpiece holder that holds the workpiece, a spindle device that rotates the workpiece holder, a tool holder that holds a tool, and a relative moving mechanism that relatively moves the workpiece holder and the tool holder at least in two axial directions orthogonal to each other. In the machining device, positioning errors in the axial directions are within 5 nm.

3 Claims, 12 Drawing Sheets

(56) References Cited

OTHER PUBLICATIONS

English language translation of JP 2002-176763 published on Jun. 21, 2002.
English language abstract of JP 2001-009663 published on Jan. 16, 2001.
English language translation of JP 2001-009663 published on Jan. 16, 2001.
English language abstract of JP 2009-233837 published on Oct. 15, 2009.
English language translation of JP 2009-233837 published on Oct. 15, 2009.
English language abstract of JP 2007-266585 published on Oct. 11, 2007.
English language translation of JP 2007-266585 published on Oct. 11, 2007.

* cited by examiner

STEP RESPONSE

1

CUTTING METHOD AND CUTTING DEVICE FOR HARD MATERIAL

The entire disclosure of Japanese Patent Application No. 2008-290174, filed Nov. 12, 2008, is expressly incorporated by reference herein.

BACKGROUND OF THE INVENTION

1. Field of the Invention

The present invention relates to a method and a device for cutting highly-hard materials. More specifically, the present invention relates to a cutting method and a cutting device for cutting cemented carbide and the like used for a mold for aspherical lenses.

2. Description of Related Art

Typically, aspherical lenses are mass-produced by casting or molding. When plastic lenses are produced, an electroless NiP plated mold is used because the molding temperature is relatively low. When glass lenses are needed for the desired optical properties, cemented carbide having excellent material properties under high temperature is mainly used as a mold material because the molding temperature is 800 degrees C. or more. Cemented carbide easily causes tool wear and brittle fracture of a finished surface. Accordingly, a grinding machining is often applied.

For manufacturing a mold for aspherical lenses by grinding, a center and radius of a grinding stone are initially set, and a machining program is prepared based on an aspherical design formula, a radius of a tool and a machining state. A machining is performed in accordance with the prepared machining program, and the machining accuracy of a finished surface is measured by a profile measuring instrument. Then, whether or not a profile error is within a tolerable value is checked. When the profile error is not within the tolerable value, another machining program is prepared in the light of the error to perform a correction machining. This series of operation is repeated until a predetermined accuracy is obtained.

However, it is required to completely correct error factors such as misalignment of the center of the grinding stone or machining unevenness within a few times because the grinding stone becomes worn as the machining is performed. Since the machining program is prepared corresponding to the diameter of the grinding stone during the machining, machining reproducibility of the program is lost when the grinding stone becomes worn, which induces a new error factor.

Especially, during a finishing machining, a grinding stone becomes worn quickly because a particle diameter of the grinding stone is extremely small. Accordingly, it is difficult to find an accurate diameter of the grinding stone. When it takes time to find an optimum value, a cutting edge gets dull and the surface of the grinding stone needs to be newly dressed, which means the machining needs to be started over.

Skills and experiences are necessary to perform a grinding machining which is required to be highly accurate and efficient. However, the grinding machining is not efficient because the feeding speed is low. Further, a grinding stone sometimes rotates idly without touching a workpiece because it is difficult to check a machining state at a machining point. To alleviate such inefficiency, various application technologies have been developed for the grinding machining. For example, a device for detecting a contact of a grinding stone with a workpiece and monitoring the grinding stone and a machining state of the workpiece has been developed (for instance, see Document 1: JP-2006-26855).

Although considerable effort has been focused on improving efficiency of the grinding machining as described above, efficiency, accuracy and fineness achievable by the grinding machining are still below those achievable by a cutting machining. Thus, it is getting difficult for the grinding machining to meet demands of the market.

On the other hand, a lot of studies have been done so that the cutting machining can be more widely applied for ultra-precise machining. Because hard and brittle materials such as glasses and ceramics have excellent material properties, there have been great expectations for ductile-mode machining using a single-crystal diamond cutting tool and thus a lot of studies have been reported. The studies have reported that, when a machining unit of hard and brittle materials is reduced using a sharp cutting edge, a material removal mechanism mainly based on plastic deformation is adopted, and that a smooth finished surface without brittle fracture such as cracks can consequently be obtained. A chip thickness at the condition of brittle-ductile transition is referred to as a critical chip thickness dc. The dc values of various hard and brittle materials obtained under various machining conditions have been reported.

Cemented carbide used for a mold for aspherical lenses is classified as one of hard and brittle materials, but is a hard-to-cut material having high-hardness properties and is a sintered material containing various binder metals. Accordingly, when a typical cutting machining using a diamond tool is performed in ductile-mode, the diamond tool becomes abrasively worn by super-hard fine particles and also by repeated adhesion and delamination.

Further, cracks on a combined surface between the super-hard fine particles and binder metals easily cause brittle fracture. Since the tool is seriously worn and the brittle fracture occurs on the target material as described above, there have been major problems for practically applying the ductile-mode cutting machining to cemented carbide.

SUMMARY OF THE INVENTION

An object of the invention is to solve such problems and to provide a cutting method and a cutting device capable of cutting materials having high hardness in ductile mode.

A method of cutting a workpiece made of a highly hard material according to an aspect of the invention includes: cutting the workpiece using a machining device including: a workpiece holder that holds the workpiece; a tool holder that holds a tool; a rotation drive mechanism that rotates the workpiece holder; and a relative moving mechanism that relatively moves the workpiece holder and the tool holder at least in two axial directions orthogonal to each other, positioning errors of the machining device in the axial directions of the relative moving mechanism being 5 nm or less.

The positioning errors in the axial directions of the relative moving mechanism means a difference between an actual movement position and a command position. The positioning error in each axial direction needs to be within 5 nm, but preferably within 4 nm and more preferably within 3 nm.

The highly-hard material is a material having a Rockwell hardness (HRA) of 70 or more such as cemented carbide. Incidentally, cemented carbide is an alloy obtained by sintering hard metal carbide powders. Typically, tungsten carbide (WC) and cobalt as a binder are mixed and sintered to obtain cemented carbide.

According to the above arrangement, the workpiece made of a highly-hard material is cut by the machining device including the relative moving mechanism that relatively moves the workpiece holder and the tool holder at least in the two axial directions orthogonal to each other and having positioning errors within 5 nm in the axial directions of the relative moving mechanism. Thus, from the start of a machining to the end, the machining can he performed in ductile mode where a chip thickness of the workpiece machined by the tool is always less than or equal to a critical chip thickness.

Preferably in the method according to the aspect of the invention, the tool is made of a single crystal or multicrystal diamond, and the workpiece is cut while a rotating speed of the rotation drive mechanism and a movement of the relative moving mechanism are controlled so that a chip thickness of the workpiece cut by the tool is 20 to 60 nm.

Since the tool is made of a single-crystal or multicrystal diamond and the rotating speed of the rotation drive mechanism and the displacement of the relative moving mechanism are controlled so that the chip thickness of the workpiece machined by the diamond tool is 20 to 60 nm according to the above arrangement, the chip thickness can be maintained to he less than or equal to the critical chip thickness even when the hard material such as cemented carbide is used. In other words, when cemented carbide is used, the machining can be performed in ductile mode because the critical chip thickness is 20 to 60 nm.

Preferably in the method according to the aspect of the invention, the relative moving mechanism includes: a fixed member; a moving member that moves relative to the fixed member; a guide mechanism provided between the fixed member and the moving member; and a linear drive mechanism that moves the moving member relative to the fixed member, the linear drive mechanism is provided by a linear motor mechanism, and the guide mechanism is provided by a rolling guide mechanism including: a pair of V-grooves parallely provided on the fixed member along a moving direction of the moving member and spaced away from each other; ridges protruding from the moving member to define V-shapes and opposing to the V-grooves; and rolling members interposed between inclined surfaces of the V-grooves and the ridges.

Since the linear motor mechanism is used as the linear drive mechanism according to the above arrangement, the power consumption can be extremely lowered irrespective of high torque. In addition, since the linear motor mechanism is used in combination with the rolling guide mechanism having a highly rigid guide surface, high control characteristics can be obtained. For example, as is understood from FIG. 6 that shows step response of a moving axis, the positioning of 1 nm can be reliably performed in as short a period of time as approximately 0.1 seconds. While a fine chip thickness needs to be maintained in ductile-mode cutting, the above arrangement can perform the ductile-mode cutting because high control characteristics can be obtained.

Preferably in the method according to the aspect of the invention, the rotation drive mechanism includes: a bearing; a spindle rotatable on the bearing and holding the tool on an end; and an aerostatic bearing provided between the bearing and the spindle.

According to the above arrangement, the spindle is rotatably supported by the aerostatic bearing in the rotation drive mechanism. Thus, a highly accurate machining can be performed.

A cutting device for cutting a workpiece made of a highly-hard material according to another aspect of the invention includes: a workpiece holder that holds the workpiece; a tool holder that holds a tool; a rotation drive mechanism that rotates the workpiece holder; a relative moving mechanism that relatively moves the workpiece holder and the tool holder at least in two axial directions orthogonal to each other, positioning errors of the cutting device in the axial directions of the relative moving mechanism being 5 nm or less.

Preferably in the cutting device according to the aspect of the invention, the tool is made of a single crystal or multicrystal diamond, and the workpiece is cut while a rotating speed of the rotation drive mechanism and a movement of the relative moving mechanism are controlled so that a chip thickness of the workpiece cut by the tool is 20 to 60 nm.

Preferably in the cutting device according to the aspect of the invention, the relative moving mechanism includes: a fixed member; a moving member that moves relative to the fixed member; a guide mechanism provided between the fixed member and the moving member; and a linear drive mechanism that moves the moving member relative to the fixed member, the linear drive mechanism is provided by a linear motor mechanism, and the guide mechanism is provided by a rolling guide mechanism including: a pair of V-grooves parallely provided on the fixed member along a moving direction of the moving member and spaced away from each other; ridges protruding from the moving member to define V-shapes and opposing to the V-grooves; and rolling members interposed between inclined surfaces of the V-grooves and the ridges.

By the use of the cutting device with the above arrangement, the same advantages as described above for the cutting method can be attained.

DETAILED DESCRIPTION OF PREFERRED EMBODIMENT(S)

Exemplary embodiment(s) of the invention will be described below with reference to the accompanying drawings.

[Machining Device A]

Figure 1:
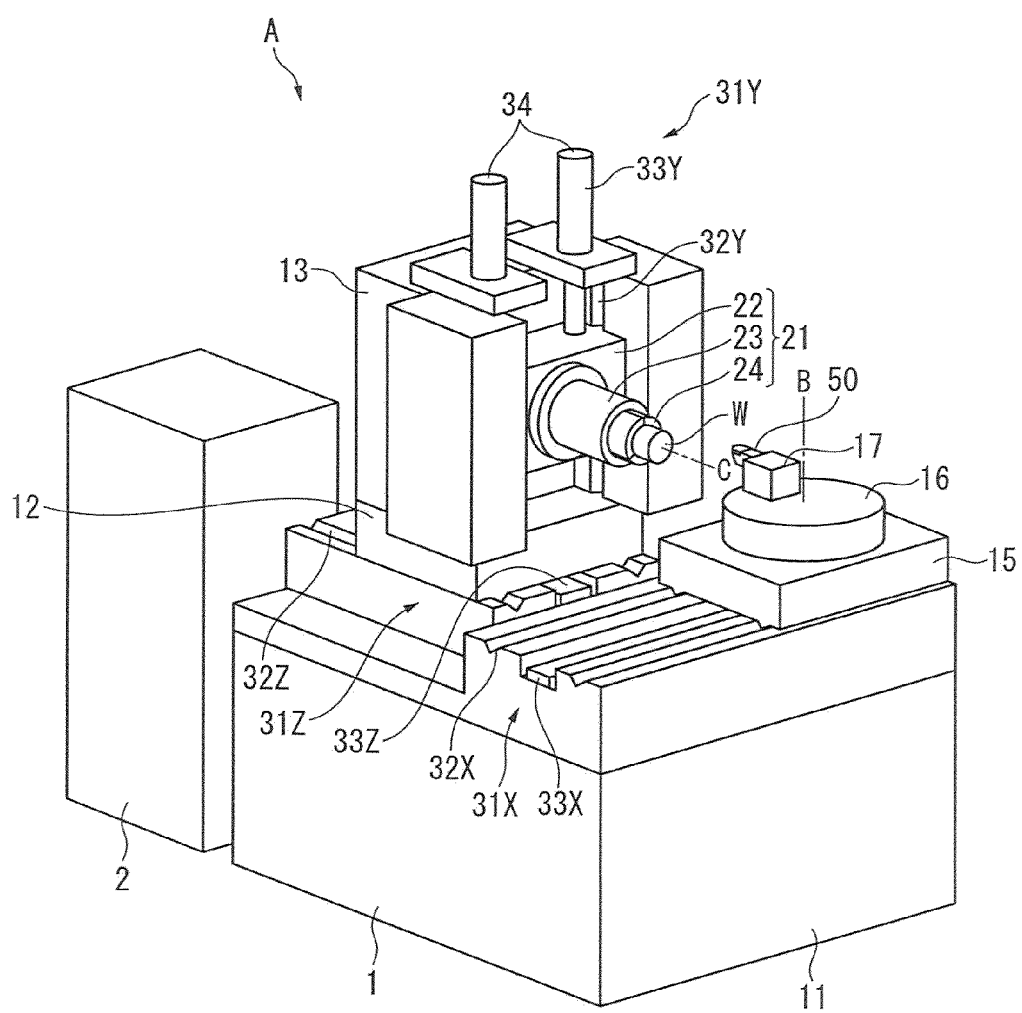
FIG. 1 is a perspective view showing a machining device A according to an exemplary embodiment of the invention.

FIG. 1 is a perspective view showing a machining device A according to an aspect of the invention.

The machining device A includes a precision machine body 1 for cutting a workpiece W made of a highly-hard material and a controller 2 for controlling the drive of the precision machine body 1 in accordance with a preset machining program. The workpiece W is made of a highly-hard material having a Rockwell hardness (I-IRA) of 70 or more such as cemented carbide.

The precision machine body 1 includes: a bed 11; a Z-table 12 movable in the front-rear direction (Z direction) on a rear side on an upper surface of the bed 11; a column 13 fixed on an upper surface of the Z-table 12; a spindle device 21 movable in the up-down direction (Y direction) along the column 13; an X-table 15 movable on a front side on the upper surface of the bed 11 in the right-left direction (X direction) orthogonal to the Z and Y directions; a rotary table 16 rotatable around an axis parallel to the Y direction (B axis) on an upper surface of the X-table 15; and a tool holder 17 provided on an upper surface of the rotary table 16 for holding a tool 50.

The spindle device 21 includes: a bearing 22 movable in the up-down direction along the column 13; a spindle 23 provided on the bearing 22 to be rotatable around a C axis parallel to the Z direction; an aerostatic bearing (not shown) provided between the bearing 22 and the spindle 23; and a motor (not shown) serving as a driving source for rotating the spindle 23. A workpiece holder 24 for holding the workpiece W is provided on an end (a right end in FIG. 1) of the spindle 23. The spindle device 21 provides a rotation drive mechanism for rotating the workpiece holder 24.

A Z-axis moving mechanism 31Z is provided between the bed 11 and the Z-table 12; a Y-axis moving mechanism 31Y is provided between the column 13 and the bearing 22; and an X-axis moving mechanism 31X is provided between the bed 11 and the X-table 15. The Z-axis moving mechanism 31Z, the Y-axis moving mechanism 31Y and the X-axis moving mechanism 31X provide a relative moving mechanism for relatively moving the workpiece holder 24 and the tool holder 17 at least in two axis directions orthogonal to each other (in three axis directions in this exemplary embodiment).

The Y-axis moving mechanism 31Y includes: the column 13 that is a fixed member; the bearing 22 that is a moving member movable relative to the column 13; a guide mechanism 32Y provided between the column 13 and the bearing 22; and a linear drive mechanism 33Y for moving the bearing 22 relative to the column 13. The linear drive mechanism 33Y is provided by a pair of vertical drive mechanisms 34 provided on an upper end of the column 13 for lifting and lowering the bearing 22 and positioning the bearing 22 at a desired position.

The Z-axis moving mechanism 31Z includes: the bed 11 that is a fixed member; the Z-table 12 that is a moving member movable relative to the bed 11; a guide mechanism 32Z provided between the bed 11 and the Z-table 12; and a linear drive mechanism 33Z for moving the Z-table 12 relative to the bed 11.

The X-axis moving mechanism 31X includes: the bed 11 that is a fixed member; the X-table 15 that is a moving member movable relative to the bed 11; a guide mechanism 32X provided between the bed 11 and the X-table 15; and a linear drive mechanism 33X for moving the X-table 15 relative to the bed 11.

Figure 2:
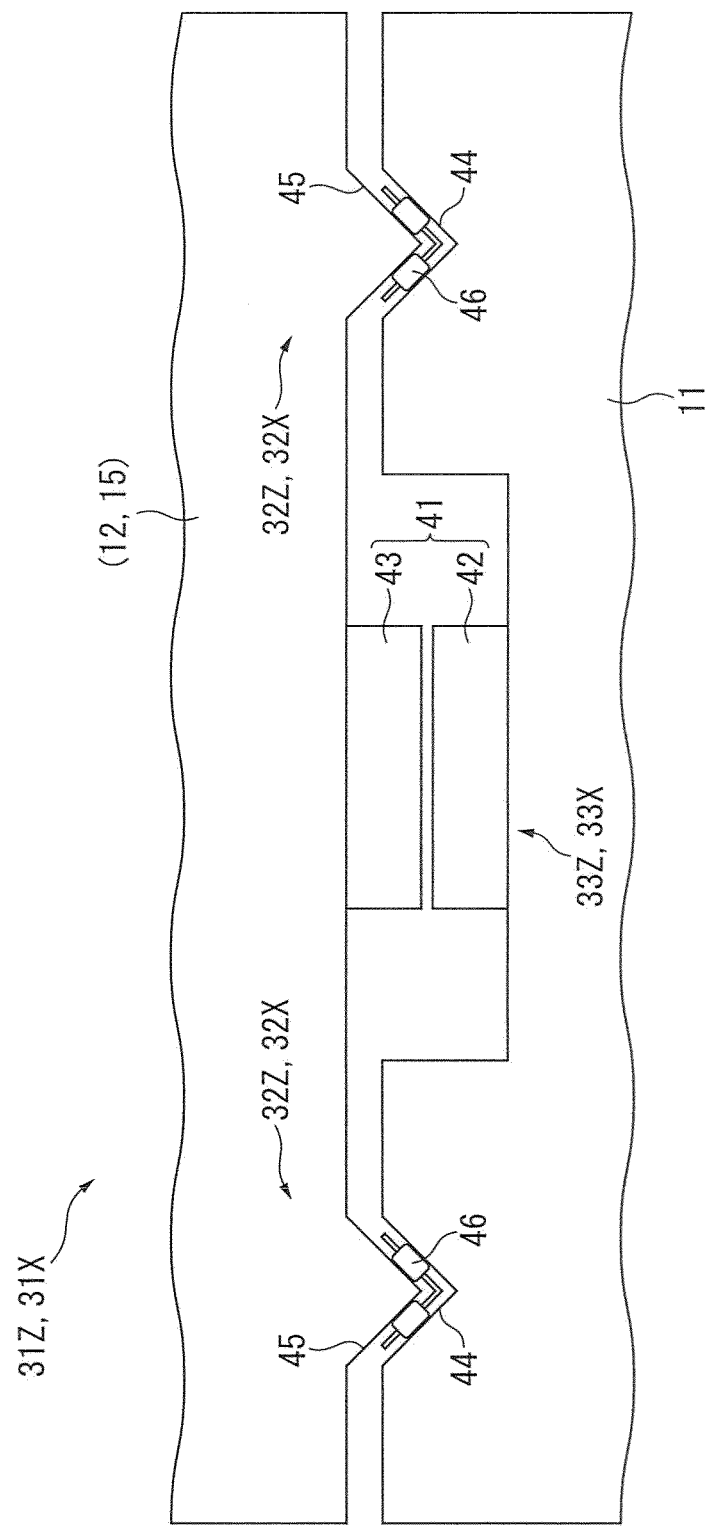
FIG. 2 shows a rolling guide mechanism used in the machining device A according to the exemplary embodiment.

A linear motor mechanism 41 is used for the linear drive mechanism 33Z and 33X of the Z-axis moving mechanism 31Z and X-axis moving mechanism 31X as shown in FIG. 2. The linear motor mechanism 41 includes: a coil 42 serving as a stator provided on the fixed member (bed 11) along the moving direction of the moving member (Z-table 12, X-table 15); and a magnet 43 serving as a mover provided on the moving member (Z-table 12, X-table 15) to be opposite to the coil 42.

As shown in FIG. 2, the guide mechanism 32Z, 32X is provided as a rolling guide mechanism that includes: a pair of V-grooves 44 provided on the fixed member (bed 11) along the moving direction of the moving member (Z-table 12, X-table 15) and spaced away from each other; ridges 45 each protruding from the moving member (Z-table 12, X-table 15) to define a V-shape and opposing to the V-grooves each; and rolling members 46 each interposed between inclined surfaces of the V-grooves 44 and ridges 45.

With the above arrangement, the Z-axis moving mechanism 31Z and the X-axis moving mechanism 31X respectively perform Z-axis positioning and X-axis positioning with such accuracy that positioning errors are retained within 5 nm.

[Turning of End Surface of Workpiece by Machining Device A]

A cutting machining of a mold for aspherical lenses using the above-described machining device A will be exemplarily described below.

Figure 3:
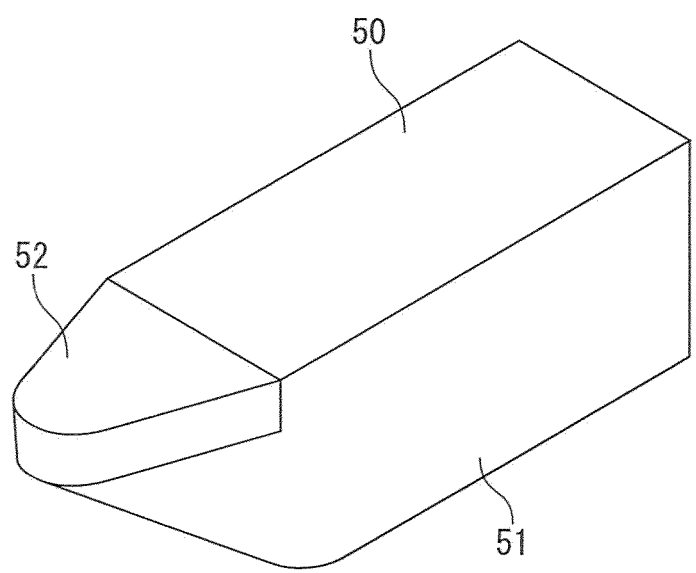
FIG. 3 is a perspective view showing a tool used in the machining device A according to the exemplary embodiment.

The workpiece W is held by the workpiece holder 24 and the tool 50 is held by the tool holder 17. As shown in FIG. 3, the tool 50 has a single-crystal or multicrystal diamond cutting edge 52 attached to an end of a tool body 51.

Figure 4:
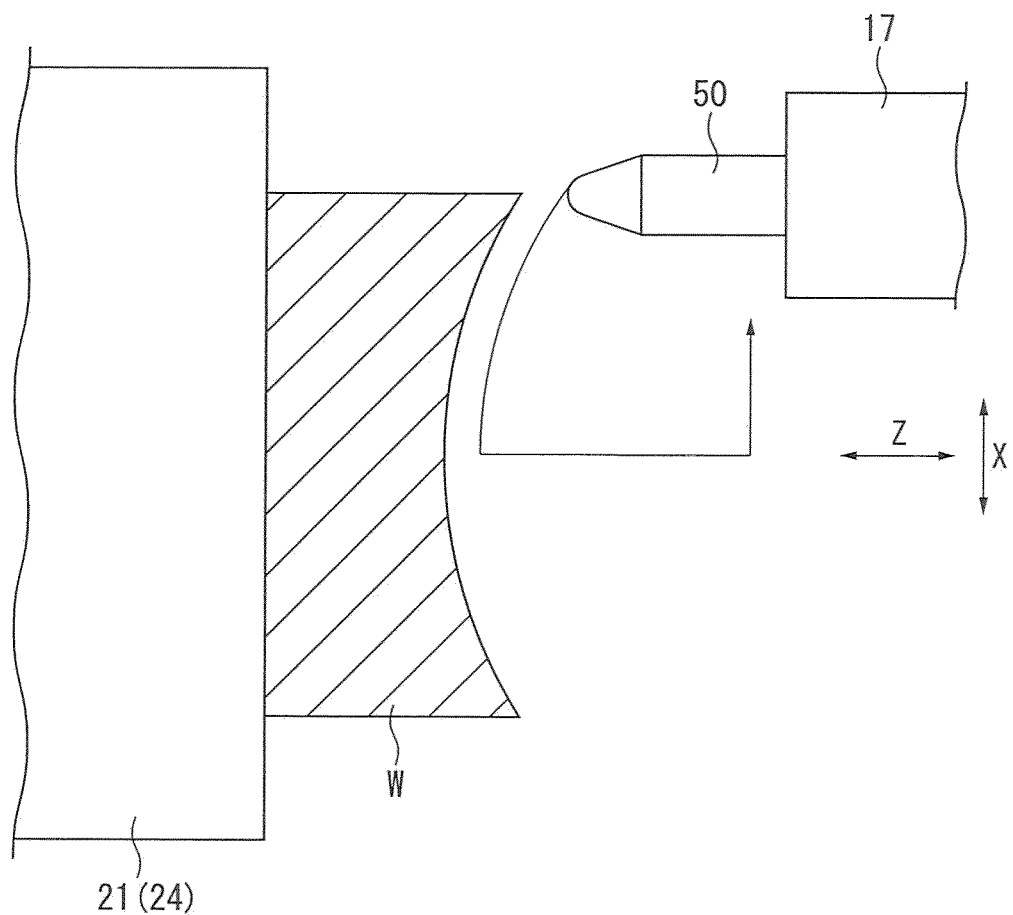
FIG. 4 shows an end surface being turned with the machining device A according to the exemplary embodiment.

As shown in FIG. 4, the workpiece holder 24 is rotated by the spindle device 21 while the Z-axis moving mechanism 31Z and the X-axis moving mechanism 31X are simultaneously controlled to relatively move the workpiece W and the tool 50 in the Z and X directions, so that the end surface of the workpiece W is cut to be a molding surface for an aspherical lens. Here, the workpiece W is cut while the rotating speed of the spindle device 21 and the movements of the Z-axis moving mechanism 31Z and X-axis moving mechanism 31X are controlled so that a chip thickness of the workpiece W cut by the tool 50 is 20 to 60 nm.

Since the linear motor mechanism 41 is used for the drive mechanism 33Z and 33X of the Z-axis moving mechanism 31Z and the X-axis moving mechanism 31X in the machining device A of this exemplary embodiment, the power consumption can be extremely lowered while maintaining high torque. In addition, since the linear motor mechanism 41 is used in combination with the rolling guide mechanism 32Z, 32X having a highly rigid guide surface, high control characteristics can be obtained.

Also, the positioning errors in the axial directions of the Z-axis moving mechanism 31Z and the X-axis moving mechanism 31X reliably remain within 5 nm. Accordingly, from the start of the machining to the end, the workpiece W made of cemented carbide can be cut in a ductile mode region where the chip thickness of the workpiece W machined by the tool 50 is less than or equal to a critical chip thickness. Especially, since the rotating speed of the spindle device 21 and the movements of the Z-axis moving mechanism 31Z and the X-axis moving mechanism 31X are controlled so that the chip thickness of the workpiece W machined with use of the single-crystal or multicrystal diamond tool 50 is 20 to 60 nm, the chip thickness can be maintained less than or equal to the critical chip thickness.

[Modifications]

It should be noted that the invention is not limited to the above-described embodiment, but includes modifications and improvements as long as an object of the invention can be achieved.

While the workpiece holder 24 is rotatable and movable in the Z and Y directions and the tool holder 17 is movable in the X direction orthogonal to the Z and Y directions in the above-described exemplary embodiment, the invention is not limited thereto.

[Machining Device B]

Figure 5:
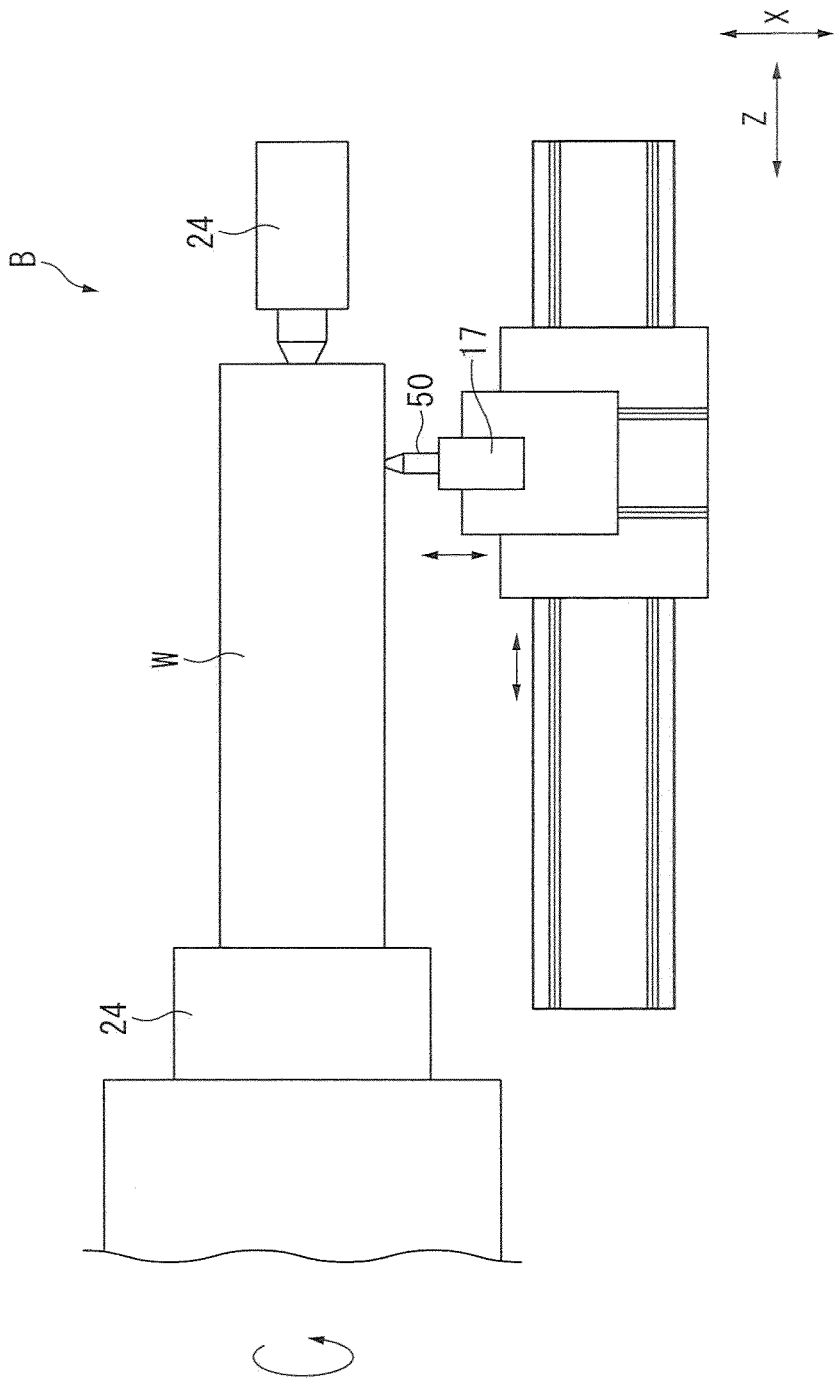
FIG. 5 shows a machining device B according to a modification of the invention.

For instance, as shown in FIG. 5, the workpiece holder 24 for holding a cylindrical workpiece W may be rotatable and the tool holder 17 for holding the tool 50 may be movable in the axial direction of the workpiece W (X direction) and the Z direction orthogonal thereto. At this time, a moving mechanism for moving the tool holder 17 in the axial direction of the workpiece W (X direction) and the Z direction orthogonal thereto includes a rolling guide mechanism and a linear motor mechanism as in the above-described exemplary embodiment.

[Turning of Circumference of Workpiece by Machining Device B]

In such a machining device B, a machining is performed by rotating the cylindrical workpiece W while moving the tool holder 17 holding the tool 50 in the axial direction of the workpiece W (X direction) and the Z direction orthogonal thereto. By cutting the workpiece W while controlling the rotating speed of the spindle device 21 and the movements of the relative moving mechanism so that a chip thickness of the workpiece W machined with the tool 50 is 20 to 60 nm, the same advantages can be attained as in the exemplary embodiment.

[Example(s)]

A workpiece W was machined with the machining device A of the exemplary embodiment.

In the machining device A, the linear motor mechanism 41 was used as the linear drive mechanisms 33Z and 33X of the Z-axis moving mechanism 31Z and X-axis moving mechanism 31X as described above. Thus, the power consumption was extremely low irrespective of its high torque. In addition, the linear motor mechanism 41 was used with the rolling guide mechanism having a highly rigid guide surface, and thus high control characteristics were obtained.

Figure 6:
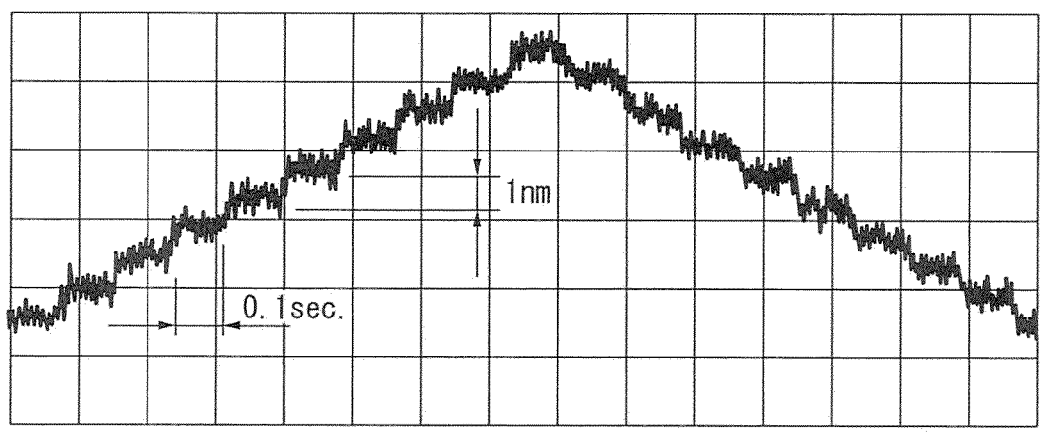
FIG. 6 shows step response of a machining device A according to Example.

FIG. 6 shows step response of a moving axis as an example of assessment of positioning characteristics. An electrostatic capacitance displacement gauge (MicroSense 6300 manufactured by ADE Corporation) was attached to the vicinity of a machining point to show the movement corresponding to a step command of 1 nm at the machining point. A sensor output was recorded through a low-pass filter of 30 Hz. Accordingly, some noise of the gauge was assumedly included, but it was found that the positioning of 1 nm was reliably performed in as short a period of time as approximately 0.1 seconds.

[Comparative(s)]

A workpiece W was machined with a machining device C including a ball screw feeding mechanism instead of the linear motor mechanism of the machining device A described in the exemplary embodiment.

[Machining Conditions]

The conditions for the machining by the machining devices A and C were as follows.

(1) Tool: single-crystal diamond tool (nose radius: 0.5 mm, rake angle: 0°, clearance angle: 10°)
(2) Spindle Rotating Speed: 500 rpm
(3) Cut: 400 nm
(4) Feed: 1.0 μm/rev
(5) Cutting Atmosphere: mist (kerosene and mineral oil)
(6) Material to Be Cut: ultrafine particle binder-less cemented carbide
(7) Machined Profile: spherical surface having curvature of 2 mm and maximum inclined angle of 60°

When the above machining conditions were set, the maximum chip thickness was approximately 40 nm.

[Machining Results]

Figure 7A:
FIG. 7A is a micrograph showing a finished surface machined with the machining device A according to Example.
Figure 7B:
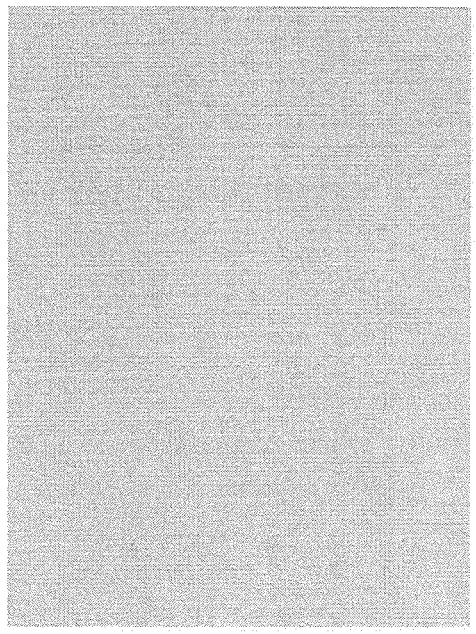
FIG. 7B is an SEM image showing the finished surface machined with the machining device A according to Example.

FIG. 7A is a micrograph showing a finished surface machined with the machining device A, and FIG. 7B is an SEM (scanning electron microscope) image showing the finished surface. It was found that no defect were observed on the entire finished surface and the finished surface was smooth. When taking a closer look, it was found that clear feed marks were regularly transferred and the finished surface was smooth without any small defects.

Figure 8A:
FIG. 8A is a micrograph showing a finished surface machined with a machining device C according to Comparative.
Figure 8B:
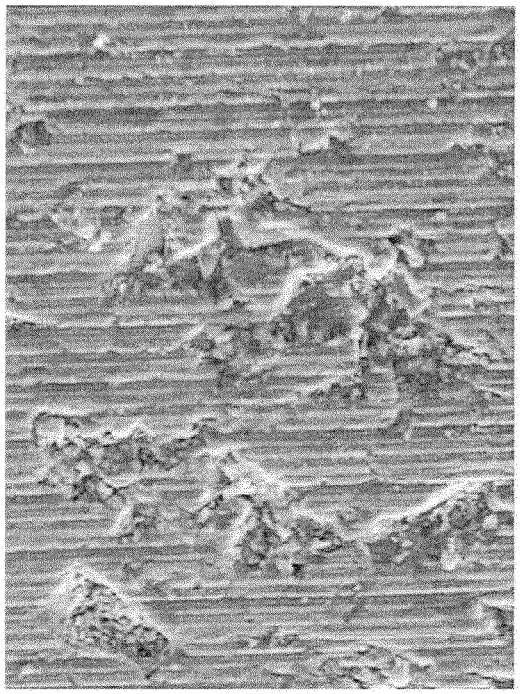
FIG. 8B is an SEM image showing the finished surface machined with the machining device C according to Comparative.

FIG. 8A is a micrograph showing a finished surface machined by the machining device C, and FIG. 8B is an SEM image showing the finished surface. Small cratered asperities were observed and a pearskin pattern occupied the entire finished surface. Thus, the surface texture was coarse. When the asperities were magnified for closer observation, cratered fracture signatures were observed in addition to transferred feed marks.

Figure 9:
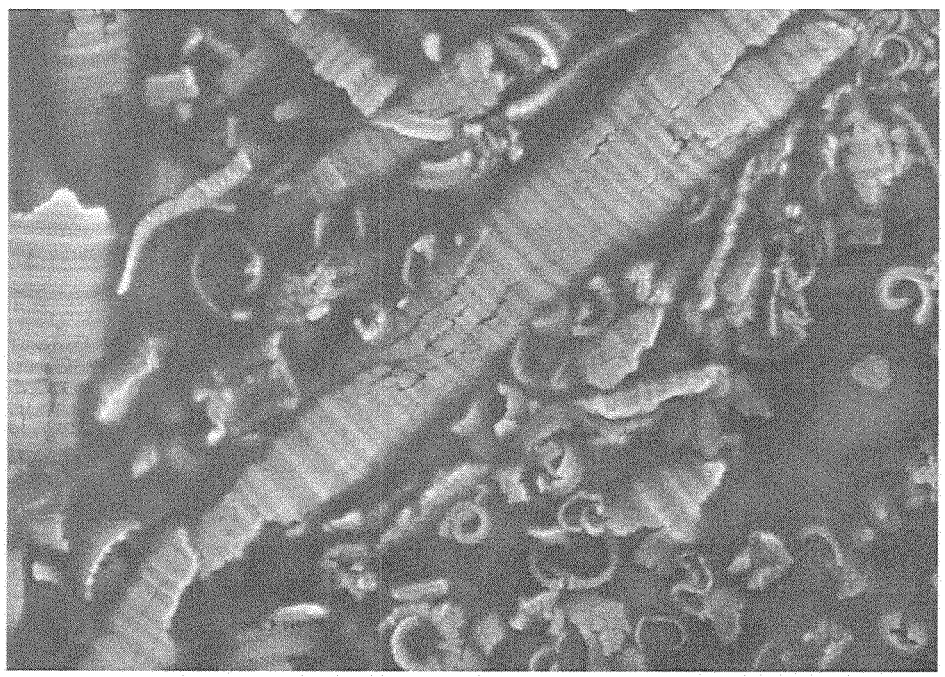
FIG. 9 is an SEM image showing swarfs discharged by the machining device A according to Example.

FIG. 9 is an SEM image showing swarfs removed from the workpiece W machined by the machining device A. The swarfs were discharged while forming a continuous stream, and filaceous patterns orthogonal to the direction where the swarfs were discharged were observed.

Studies have reported that the shape of a swarf changes from crack-type to shear-type as a chip thickness is reduced and, in a ductile mode region, a stream of swarfs are stably generated while exhibiting cutting behavior similar to that obtained in a metal cutting. Studies have also reported that, when the chip thickness is increased on the other hand, cratered pearskin patterns including faults caused by cleavage fracture strength in crystals are formed on a machined surface.

Thus, from the machined surface texture and the shape of the swarfs, it was found that the machining by the machining device A was performed in a ductile mode region. On the other hand, it was found that the machining by the machining device C, though performed under the same conditions, was performed in a brittle mode region because fracture signatures were spread on the entire surface.

[Dynamic Characteristics of Device]

A transition point from ductile mode to brittle mode is uniquely identifiable from a critical chip thickness. Accordingly, to generate a predetermined profile by ductile-mode cutting, a chip thickness needs to be always equal to or less than a critical chip thickness. This is presumably because, as an element of mechanism, the dynamic characteristics unique to the machining device play a significant role as well as the control resolution and the machining program.

The chip thicknesses set in both of the above-described machining were 40 nm, but the machining outcomes became different. The difference in the behaviors at the machining points are considered to have originated from the difference in the driving systems of the machining devices A and C.

Figure 10:
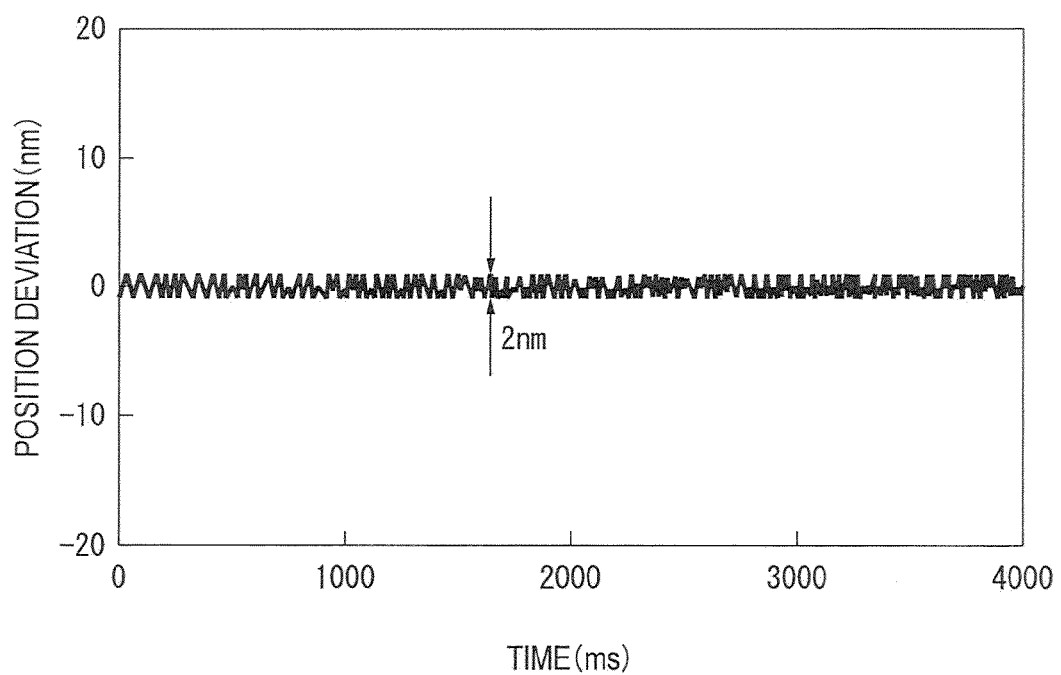
FIG. 10 shows an error of the machining device A according to Example.
Figure 11:
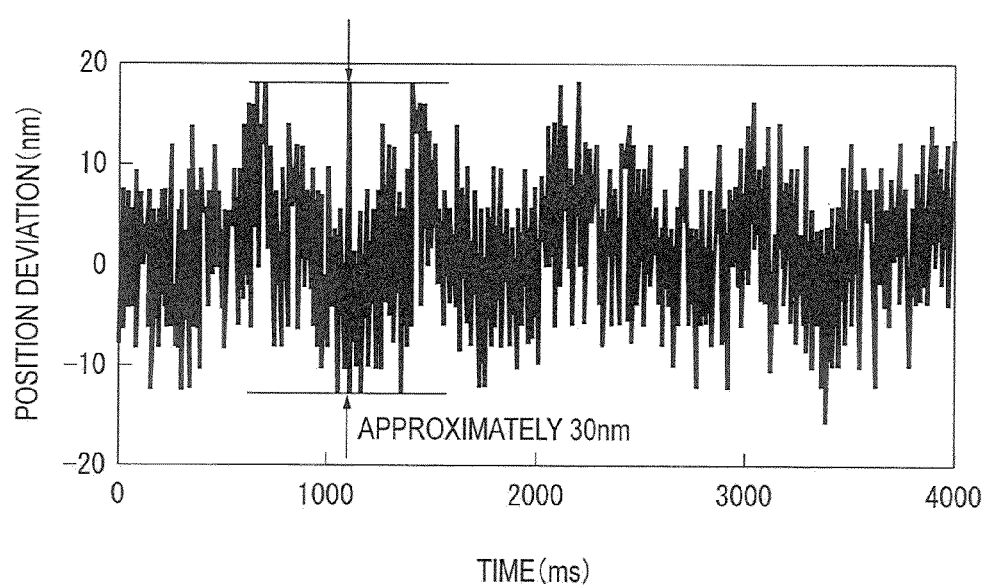
FIG. 11 shows an error of the machining device C according to Comparative.

FIG. 10 shows errors (position deviation) of the machining device A when the machining was actually performed. FIG. 11 shows errors (position deviation) of the machining device C when the machining was actually performed. As understood from these figures, the errors of the machining device A were 2 nm or less while the errors of the machining device C were approximately 30 nm.

Figure 12:
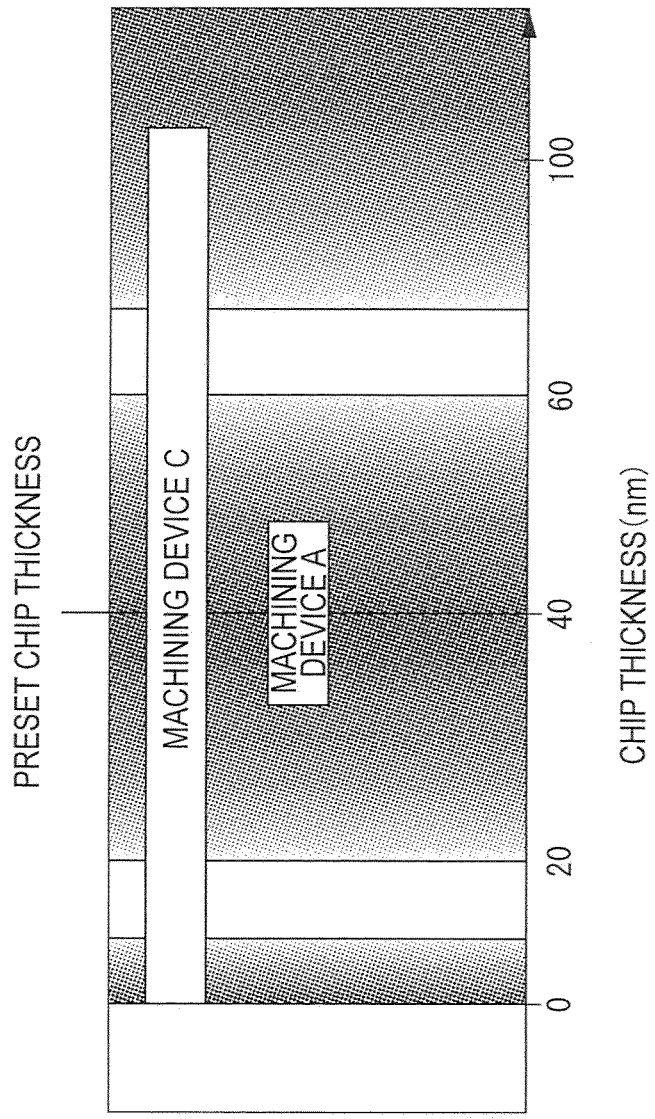
FIG. 12 shows a relationship between actual chip thicknesses with errors, a ductile mode region and a brittle mode region.

FIG. 12 shows actual chip thicknesses with errors, which were results from an comparative experiment in which the chip thickness was set at 40 nm.

It is assumed that the chip thickness was varied between approximately 36 to 44 nm in the machining device A because the machining was performed by simultaneous two-axis (X axis and Z axis) control. It is also assumed that the chip thickness was varied between approximately 0 to 100 nm in the machining device C. The machining results show that a varying range of the chip thickness in the machining device A was in the ductile mode region while a varying range of the chip thickness in the machining device C considerably exceeded the critical chip thickness and reached to the brittle mode region. Thus, the tool was damaged and the brittle fracture occurred on the machined surface only in the machining device C.

From these results, it was found that the machining device A was capable of quick positioning with nanometer precision and had dynamic characteristics for maintaining a fine cutting required for ductile-mode cutting. On the other hand, it was found that the machining device C causing serious errors did not have dynamic characteristics required for ductile-mode cutting.

What is claimed is:

1. A method of cutting a workpiece made of a highly hard material, comprising
    cutting the workpiece using a machining device comprising: a workpiece holder that holds the workpiece; a tool holder that holds a tool; a rotation drive mechanism that rotates the workpiece holder; and a relative moving mechanism that relatively moves the workpiece holder and the tool holder at least in two axial directions orthogonal to each other,
    wherein positioning errors of the machining device in the axial directions of the relative moving mechanism are 5 nm or less;
    the tool is made of a single crystal or multicrystal diamond;
    the workpiece is cut while a rotating speed of the rotation drive mechanism and a movement of the relative moving mechanism are controlled so that a chip thickness of the workpiece cut by the tool is 20 to 60 nm;
    the relative moving mechanism includes: a fixed member; a moving member that moves relative to the fixed member; a guide mechanism provided between the fixed member and the moving member; and a linear drive mechanism that moves the moving member relative to the fixed member,
    the linear drive mechanism is provided by a linear motor mechanism, and
    the guide mechanism is a rolling guide mechanism including: a pair of V-grooves parallely provided on the fixed member along a moving direction of the moving member and spaced away from each other; V-shaped ridges protruding from the moving member that are opposing to the V-grooves; and rolling members interposed between inclined surfaces of the V-grooves and the ridges.

2. The method according to claim 1, wherein
    the rotation drive mechanism includes: a bearing; a spindle rotatable on the bearing and holding the tool on an end; and an aerostatic bearing provided between the bearing and the spindle.

3. A cutting device for cutting a workpiece made of a highly-hard material, comprising:
    a workpiece holder that holds the workpiece during cutting;
    a tool holder that holds a tool during cutting;
    a rotation drive mechanism that rotates the workpiece holder;
    a relative moving mechanism that relatively moves the workpiece holder and the tool holder at least in two axial directions orthogonal to each other,
    wherein positioning errors of the cutting device in the axial directions of the relative moving mechanism are 5 nm or less;
    the tool is made of a single crystal or multicrystal diamond;
    the workpiece is cut while a rotating speed of the rotation drive mechanism and a movement of the relative moving mechanism are controlled so that a chip thickness of the workpiece cut by the tool is 20 to 60 nm;
    the relative moving mechanism includes: a fixed member; a moving member that moves relative to the fixed member; a guide mechanism provided between the fixed member and the moving member; and a linear drive mechanism that moves the moving member relative to the fixed member,
    the linear drive mechanism is provided by a linear motor mechanism, and
    the guide mechanism is a rolling guide mechanism including: a pair of V-grooves parallely provided on the fixed member along a moving direction of the moving member and spaced away from each other; ridges protruding from the moving member to define V-shapes that are opposing to the V-grooves; and rolling members interposed between inclined surfaces of the V-grooves and the ridges.

* * * * *